United States Patent [19]
Kendall et al.

[11] Patent Number: 4,958,290
[45] Date of Patent: Sep. 18, 1990

[54] BALANCER

[75] Inventors: Paul W. Kendall, Milpitas; Gregory H. Parrott, Cupertino, both of Calif.

[73] Assignee: Accu Industries, Inc., Ashland, Va.

[21] Appl. No.: 273,959

[22] Filed: Nov. 18, 1988

[51] Int. Cl.$^5$ .............................................. G01M 1/22
[52] U.S. Cl. ..................................... 364/463; 73/460; 73/462
[58] Field of Search ...................... 364/463, 508, 550; 73/650, 462, 460, 459

[56] References Cited

U.S. PATENT DOCUMENTS

| 2,322,939 | 6/1943 | Inman | 73/473 |
| 2,940,315 | 6/1960 | Rued | 73/467 |
| 3,043,146 | 7/1962 | Rued | 73/487 |
| 3,076,342 | 2/1963 | Hilgers | 73/462 |
| 3,289,483 | 12/1966 | Slemmons | 73/459 |
| 3,435,686 | 4/1969 | Waldron | 73/460 |
| 3,478,602 | 11/1969 | Tatum | 73/462 |
| 3,732,737 | 5/1973 | Forster | 73/462 |
| 3,785,210 | 1/1974 | Muller | 73/459 |
| 3,813,948 | 6/1974 | Ito | 73/460 |
| 3,847,025 | 11/1974 | Hultberg | 73/460 |
| 3,934,459 | 1/1976 | Wolfinger et al. | 73/650 |
| 4,085,619 | 4/1978 | Shapiro et al. | 73/462 |
| 4,094,198 | 6/1978 | Moulinoux | 73/462 |
| 4,149,416 | 4/1979 | Harant | 73/462 |
| 4,155,255 | 5/1979 | Sherman et al. | 73/462 |
| 4,160,384 | 7/1979 | Guyot et al. | 73/462 |
| 4,162,340 | 7/1979 | Hofmann | 73/462 |
| 4,162,633 | 7/1979 | Muller | 73/462 |

(List continued on next page.)

FOREIGN PATENT DOCUMENTS

| 1217661 | 2/1987 | Canada . |
| 2732738 | 11/1978 | Fed. Rep. of Germany . |
| 1424699 | 2/1976 | United Kingdom . |
| 1535108 | 12/1978 | United Kingdom . |
| 1554333 | 10/1979 | United Kingdom . |
| 2131561 | 6/1984 | United Kingdom . |

OTHER PUBLICATIONS

A brochure entitled "Hofmann Wheel Balancing Machine Geodyna 55-L", (two pages).
A brochure entitled "Handaangedreven Balanceermachine, Nauwkeurige Eenvoud," *Auto Motortechnick*, Cupedo, A. N., Apr. 1988 (four pages).
File history of U.S. patent application Ser. No. 395,240 filed Jul. 6, 1982 by Curchod.
Page entitled "Section One-General Information" regarding the LCB Wheel Balancer of Hofmann Corporation (p. 1—1, undated).
One page of schematic entitled "GEBR Hofmann KG" No. 781,001 (undated).
A brochure entitled "Heavy-Duty Wheel Balancing is Now ... " ( two pages, undated).

*Primary Examiner*—Thomas G. Black
*Attorney, Agent, or Firm*—Kilpatrick & Cody

[57] ABSTRACT

A method and apparatus for the measuring of the imbalance and the calculation of the location and size of the necessary weights to be added to a rotating object to balance it. Included are a mounting surface for receiving the object and a shaft affixed to and extending away therefrom with the shaft supported at two spaced apart points therealong, and a pair of pressure sensors with one each at the two support points of the shaft for providing a signal that is proportional to the force exerted by the shaft at the corresponding one of the support points as the object is rotated. In addition, a position and speed of rotation detection means is affixed to the shaft to continuously provide speed of rotation and position data of the shaft. Also there is a pair of tracking filters, each disposed to receive the output signal from a different one of the pair of pressure sensors with the center frequency of both filters being substantially the speed of rotation of the shaft. The tracking filters are provided to filter the signals from the pressure sensors to obtain a signal having frequency components that are within the vicinity of the frequency of the speed of rotation of the shaft. Finally, there is computational means coupled to receive the position and speed of rotation signals and the signals from the pair of tracking filters to compute the imbalance of the rotating object and the location and the weight to be added to bring it into balance.

20 Claims, 6 Drawing Sheets

U.S. PATENT DOCUMENTS

| | | | |
|---|---|---|---|
| 4,169,383 | 10/1979 | Guyot et al. | 73/462 |
| 4,173,146 | 11/1979 | Kogler et al. | 73/462 |
| 4,193,304 | 3/1980 | Hofmann | 73/462 |
| 4,285,240 | 8/1981 | Gold | 73/462 |
| 4,298,948 | 11/1981 | Davis | 364/463 X |
| 4,341,119 | 7/1982 | Jackson et al. | 73/462 |
| 4,423,632 | 1/1984 | Madden et al. | 73/462 |
| 4,435,982 | 3/1984 | Borner et al. | 73/462 |
| 4,450,529 | 5/1984 | Hill et al. | 364/508 |
| 4,457,172 | 7/1984 | Mathes et al. | 73/462 |
| 4,489,607 | 12/1984 | Park | 73/462 |
| 4,494,400 | 1/1985 | Hill | 73/1 B |
| 4,502,328 | 3/1985 | Wood et al. | 73/462 |
| 4,507,964 | 4/1985 | Borner et al. | 73/462 |
| 4,559,600 | 12/1985 | Rao | 364/474 |
| 4,608,650 | 8/1986 | Kapadia | 364/508 |
| 4,635,481 | 1/1987 | Curchod | 73/460 |
| 4,655,080 | 4/1987 | Ongaro | 73/462 |

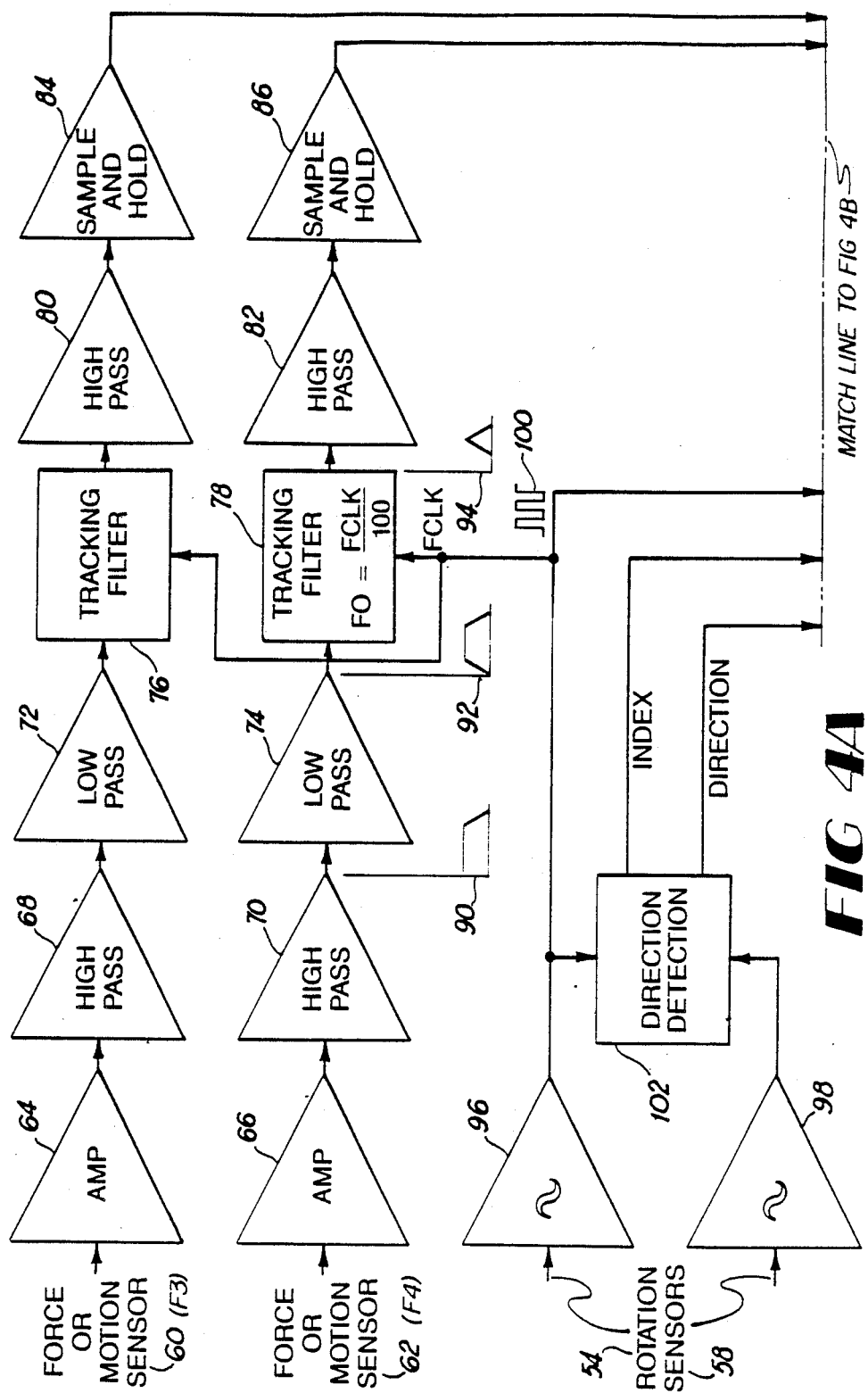

BALANCER

BACKGROUND OF THE INVENTION

The present invention relates to the determination of the location of weight additions in one or two planes of a rotating object to put the object into balance on its axis of rotation, namely, a dynamic and static balancing method and apparatus for automobile wheels and other objects that spin around a central axis in use.

There are several different dynamic balancing devices currently available, both hand spun and motor spun. Each of these basically include a mounting bracking for receiving the wheel or other rotatable mass. The mounting bracket in turn is either fixedly mounted to a shaft which is supported along its length by a pair of spaced apart bearings in which the shaft is journaled, or is mounted to a fixed shaft by means of a rotatable bearing with the shaft fixedly mounted at two spaced apart points. At each of the two spaced apart points of either design there is located a pressure, force, or displacement sensitive transducer to monitor the variations in pressure, force, or displacement applied to the shaft as the rotating object is rotated thereon. Thus, given the spacing between the two sensors, their spacing from both side planes of the rotating body, the diameter of the rotating body and an approximate speed of rotation, the imbalance of the rotating body with respect to its two side planes is calculated.

It would be desirable to have a device that has the capability of utilizing the actual speed of rotation of the body being monitored for imbalance to select the center frequency of a narrow band filter to track that speed to minimize the noise components of the signals to be processed in the determination of the imbalance of the rotating body. The present invention provides such a method and apparatus.

SUMMARY OF THE INVENTION

In accordance with the present invention a method and apparatus are disclosed which provide for the measuring of the imbalance and the calculation of the location and size of the necessary weight to be added to a rotating object to balance it. Included are mounting means disposed to receive the object for rotation thereon. The mounting includes a mounting surface for receiving the object and a shaft affixed to and extending away therefrom with the shaft supported at two spaced apart points therealong, and a pair of pressure sensors with one each disposed to be located at the two support points of the shaft for providing a signal that is proportional to the force exerted by the shaft at the corresponding one of the support points as the object is rotated. In addition there is a position and speed of rotation detection means disposed to be affixed to the shaft of the mounting means to continuously provide speed of rotation and position data of the shaft. Also there is a pair of tracking filters, each disposed to receive the output signal from a different one of the pair of pressure sensors with the center frequency of both filters responsive to the speed of rotation of the shaft. The tracking filters are provided to filter the signals from the pressure sensors to obtain a signal having frequency components that are in the vicinity of the frequency of the speed of rotation of the shaft. Finally, there is computational means coupled to receive the position and speed of rotation signals and the signals from the pair of tracking filters to compute the imbalance of the rotating object and weight to be added to bring it into balance.

DESCRIPTION OF THE PREFERRED EMBODIMENT

Figure 1:
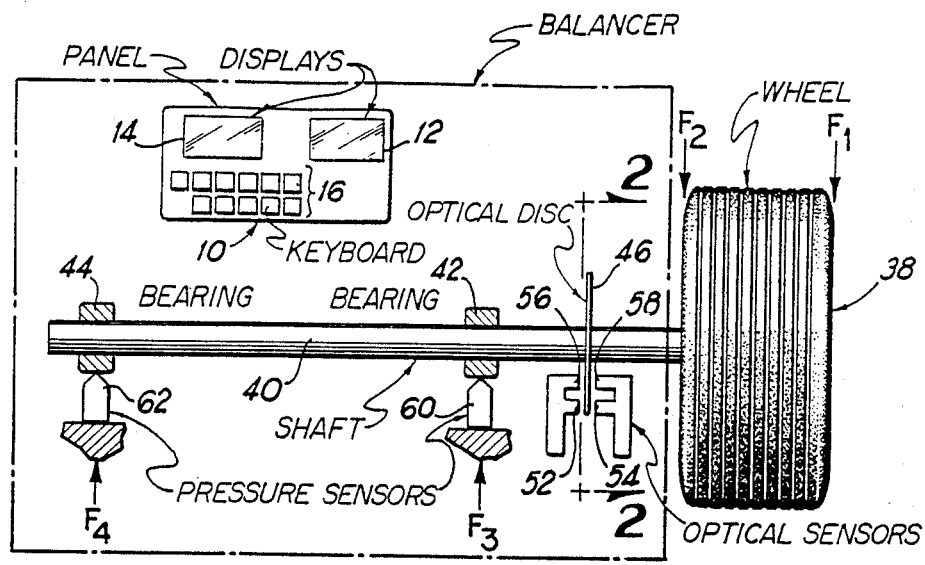
FIG. 1 is a schematic plan view of the mechanical mounting of the rotating body to be balanced by the balancer of the present invention.
Figure 2:
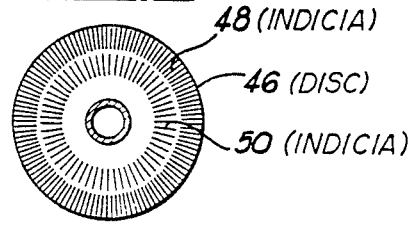
FIG. 2 is a schematic plan view of the optical position sensing disk mounted on the rotating shaft of the present invention.

FIG. 1 shows a simplified mechanical mounting system for use in balancing a rotatable object wherein, for purposes of discussion, that object is shown as an automobile wheel 38. Here wheel 38 is shown mounted on a shaft 40 which is journaled through bearings 42 and 44, and is free to rotate within those bearings. Intermediate each of bearings 42 and 44 and a corresponding fixed base are pressure sensors 60 and 62, respectively. Also mounted on shaft 40 is an optical disk 46 (see FIG. 2) having a dual set of indicia from which the speed and direction of rotation, and position of the shaft can be determined from the signals generated by the first and second optical sensors 52-54 and 56-58 arranged to produce signals in quadrature. In the prototype design, a disk with 100 teeth in each set of indicia was used. By determining which of the sensor signals is leading the other, direction of rotation is determined. It should be noted here, that the present invention can be used with hand or motor spun systems and utilize any of the various mechanical wheel mounting systems already available in the prior art wheel balancing machines and that the present invention is not limited to the mounting system shown here.

Figure 3:
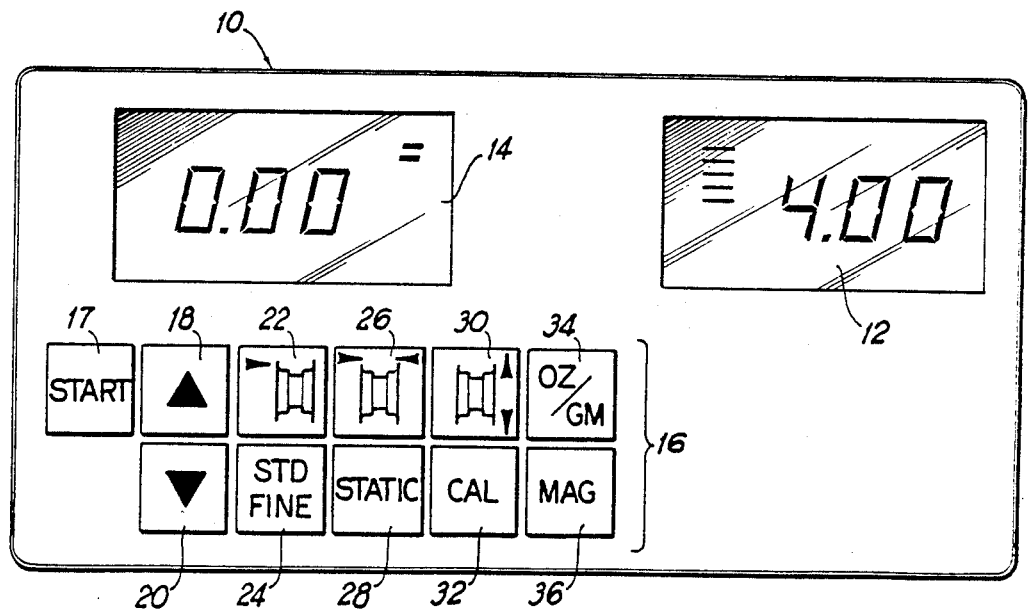
FIG. 3 is a schematic plan view of the control panel of the balancer of the present invention.

FIG. 3 represents control panel 10 of the prototype design of the present invention which incorporates displays 12 and 14, and keyboard 16. Displays 12 and 14 are provided to show the size and location of the weights to be added to the sides of wheel 38 corresponding to the positions of the arrows labeled F1 and F2, respectively, in FIG. 1. The displays are also used during the calibration mode, as discussed below, to show the entries being made, and having been made, by the user of the wheel balancer of the present invention for the distance of the side of the wheel corresponding to the positions of the arrow labeled F2 from the location of the arrow labeled F3 in FIG. 1, the measured width of the wheel, and the inner diameter of the wheel. Each of displays 12 and 14 are dual displays in that they include a numeric display and a bar display. The numeric display provides the information as to the size of the weight needed on the corresponding side of wheel 38. The bar display, when all of the bars are illuminated, indicates when wheel 38 is positioned such that the point at which the weight is needed for the corresponding side of the wheel is at the top. When the point on the wheel where the weight is needed is at the bottom, none of the bars are illuminated.

Keyboard 16 includes eleven push buttons, or keys, 17-36. To place the wheel balancer in the calibration mode to balance a wheel, CAL button 32 is depressed. Then the three physical measurements that are needed to calculate the necessary weights on the wheel are entered by the user. First the user depresses one of the three buttons 22, 26 or 30, and enters the corresponding measurement by repeatedly depressing the up arrow button 18 or the down arrow button 20 to increase or decrease the displayed number until the correct measured value is displayed. This process is then repeated for each of the other two measured values that need to be entered. The start button 17 is depressed to spin the wheel until it achieves a preselected speed, the electronics determine the point on the wheel where the greatest forces are generated, and advises the user to place a 4 oz. or 100 gram weight on the outer side of the wheel. This calculation, as well as the other calculations, will be discussed in greater detail below. Button 34 is provided so that the user can select the display of the calculated values for the weights to be placed on the wheel in values rounded off to the nearest quarter of an ounce or five gram increment. Dynamic balancing is the default calculation mode, the static (28), and mag (36) buttons are provided to permit the user to select static or mag wheel balancing, respectively.

If the static mode is selected by depressing static switch 28, the calculations will be performed to place the needed weights in a single plane of the rotating object. For example, in the center of a motorcycle wheel or on only the outer plane of an automotive wheel. In the static mode, the only dimension that the user will have to enter is the diameter of the wheel. In this mode, in effect, it is assumed that planes of F1 and F2 are the same plane. In this mode, only display 12 will be illuminated with the values of the weights to be added to the wheel being the sum of the values calculated for the planes of F1 and F2 since those two planes are coincident.

Similarly, if the mag wheel mode is selected by depressing switch 36, the calculations will be performed to place the needed weights on the inner surface of the wheel and as far into the wheel toward the outer surface that one can do so. In the mag wheel mode the dimensions that the user will have to enter are the same as for dynamic mode. In mag mode, the plane of F2 is offset one inch towards the center of the wheel and the plane of F1 is offset towards the center of the wheel by 30 percent of the wheel width. The rim diameter is reduced for both F1 and F2 to compensate for the mag wheel profile. Both displays 12 and 14 are used in mag wheel mode, as in the dynamic mode since weight values for placement in each of the two planes is being calculated.

Figure 4B:
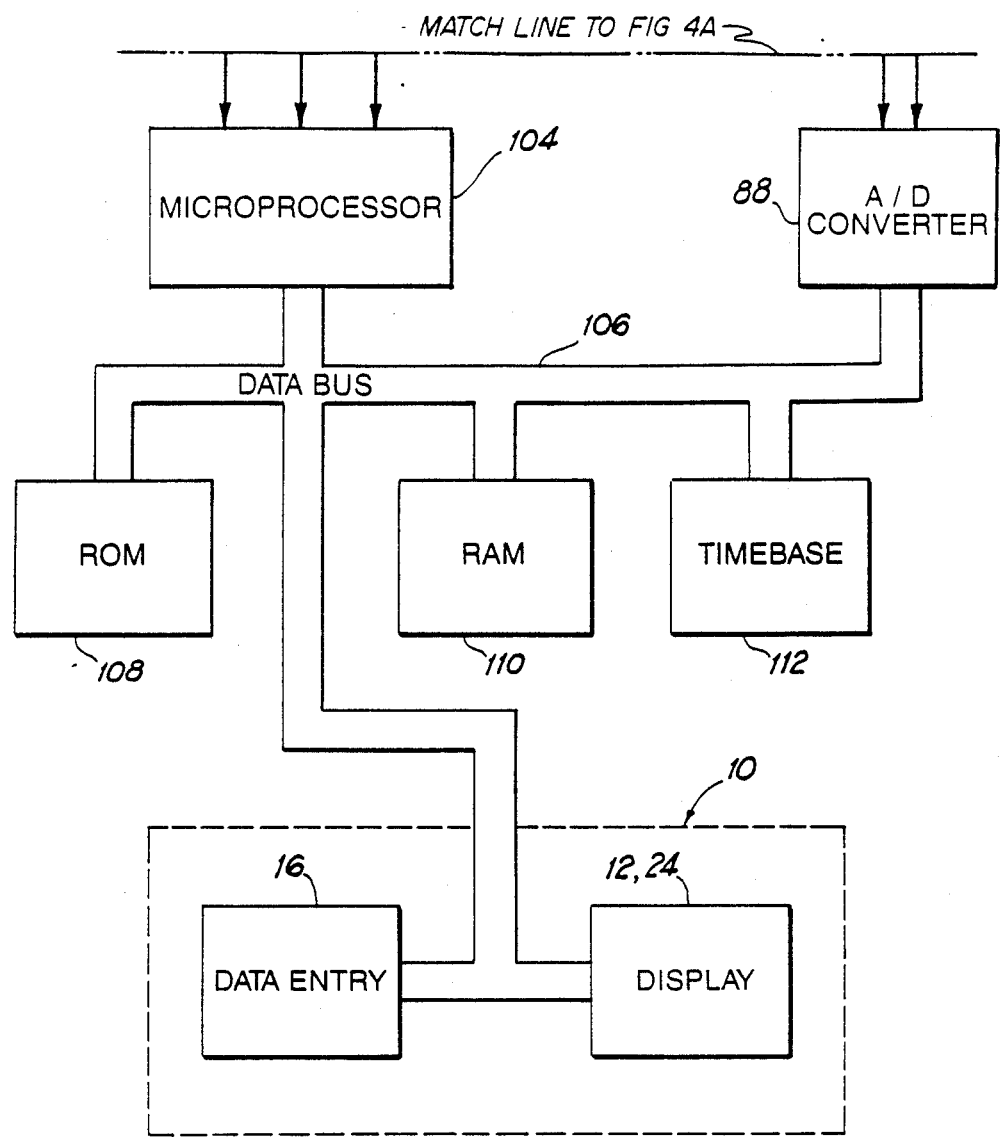
FIG. 4 is a block schematic diagram of the data processing circuit of the present invention.

FIG. 4 is a schematic representation of the circuit elements of the balancer of the present invention. In the upper left corner, the signals generated by sensors 60 and 62, located at the positions indicated by the arrows labeled F3 and F4, respectively, in FIG. 1, are inputted to two substantially identical signal channels for processing. The signals from sensors 60 and 62 are analog signals that have an amplitude at any point in time that is proportional to the force applied to the mounting brackets at those locations by shaft 40 as wheel 38 is spun thereon. These forces have been labeled F3 and F4 for purposes of the calculation of the forces F1 and F2 (the forces on either side of the wheel being balanced) in order to determine the values and location of the necessary weights to be placed on wheel 38. Piezo electric sensors are typically used for sensors 60 and 62, however, other types of sensors could also be utilized, e.g. strain gauges. The type of sensors 60 and 62 used determines the gain and type of amplifiers 64 and 66 that are necessary.

Each signal processing channel includes a serial connection of elements which in order include: an amplifier (64 or 66), a first high pass filter (68 or 70), a low pass filter (72 or 74), a tracking filter (76 or 78), a second high pass filter (80 or 82) if necessary to remove any DC offset that may have been introduced by the tracking filter, a sample and hold circuit (84 or 86), and each of the output signals from sample and holds 84 and 86 are applied to an A/D converter 88. Each of these channels are the same as the other with the exception that the gain of amplifier 66 is greater than the gain of amplifier 64. This is necessary to normalized the gain between sensors 60 and 62 because the signal level from sensor 62 is lower than the signal level from sensor 60 since sensor 62 is located farther from wheel 38 than is sensor 60.

If sensors 60 and 62 are piezo electric sensors, amplifiers 64 and 66 can be charge coupled amplifiers which would fulfill the function of both the amplifier and the first high pass filter, otherwise, and first high pass filter can be designed by known operational amplifier technology. The pass band created by first high pass filters 68 and 70 is shown by waveform 90 with the cut-off frequency for balancing automotive wheels typically being selected to be 16 Hz (960 R.P.M). Low pass filters 72 and 74 can also be designed with opertional amplifier technology, and the composite pass band of the signals from filters 72 and 74 is shown by waveform 92. Similarly, for the application of automotive wheel balancing, the lower cut-off frequency is typically 0.3 Hz (18 R.P.M.). This bandwidth then is sufficiently broad to allow the amplitude of the response waveform to be fairly constant throughout the pass band, yet the pass band is sufficiently narrow to include spin rates that can be comfortably achieved by either hand or motor spinning the wheel fast enough to obtain accurate results and slow enough to maximize safety of operation of the balancer. The signals from the low pass filters 72 and 74 are then applied to tracking filters 76 and 78, respectively, having a center frequency that corresponding to the speed of rotation of the wheel and that is within the pass band of the composite filter depicted by waveform 92. Additionally, the Q of filters 76 and 78 is higher than the Q of waveform 92.

Tracking filters 76 and 78 can be implemented by several different techniques in either software, firmware or hardware. The software and firmware techniques rely on digital filtering technology, and the hardware implementation may be accomplished with switched cap filters (e.g. Model MF-10 switched cap filters from National Semiconductor). Depending on the implementation selected for tracking filters 76 and 78, sample and holds 84 and 86 may, or may not, be necessary. If the output signal from tracking filters 76 and 78 is an analog signal composed of discrete D.C. voltage steps, as it would if switch cap filters are used, the function of sample and holds 84 and 86 is incorporated into the tracking filter, thus the individual sample and holds would not be necessary.

By using the combined filter technique discussed above, there is a high rejection of unwanted noise and added accuracy in the calculation of the weights and their placement for wheels that are either hand or motor spun. In the prior art when the wheel is motor spun, the speed of rotation is presumed to be the designed for speed despite mechanical drag coefficients that vary with the size and weight of the wheel, which change the speed of rotation and thus result in a loss in accuracy of any measurements and calculations. Similarly with hand spun balancers, the wheel is spun until an alarm is sounded at a selected speed at which time the user stops spinning the wheel. The calculations are then performed by the balancer electronics under the assumption that the speed of the wheel remains constant during that period despite the fact that the wheel begins to slow down as soon as the user stops spinning the wheel. Here, as in the motor spun case, the rate at which the wheel slows down varies with the drag coefficients of the wheel which contributes to the inaccuracies of the prior art devices.

Simultaneously with the processing of the signals from the force or motion sensors 60 and 62, the signals from rotation sensors 52–58 are processed. Mounted on the shaft on which the wheel is rotating is the optical encoder disk 46 (see FIGS. 1–2). In conjunction with disk 46 are sensors 52–58 to detect the presence and absence of the dual indicia bars on disk 46 from which the speed and direction of rotation, and the position, of shaft 40 can be determined. The signals from optical detectors 54 and 58 are applied to Schmidt triggers 96 and 98, respectively. The output signals from Schmidt trigger 96 is a square wave clock signal with the signal changing state on the leading and trailing edges of each of the index marks being monitored by detector 54. Typically, the circumference of optical disk 48 has 100 index marks, thus the frequency of signal 100 from Schmidt trigger 96 is 100 times the frequency of revolution of wheel 38. Signal 100 is applied to tracking filters 76 and 78 as their clock frequency where it is divided internally by 100 so that the center frequency of the tracking filter corresponds to the frequency of revolution of wheel 38. Provision is made in the commercially available switch cap filters mentioned above to selectively divide the input clock signal by several values, including 100. The output signal from both Schmidt triggers 96 and 98 are applied to a direction detector 102 of a usual design to determine the direction of rotation and position of shaft 40 at any point in time.

The final portion of the circuitry of the present invention consists of a microprocessor 104 interconnected via data bus 106 to ROM 108, RAM 110, timebase 112, and the data entry buttons 16, and the displays 12 and 14 on control panel 10. The output signals, in the form of digital words, from A/D converter 88 are provided to microprocessor 104 via data bus 106 and the index, direction and speed of rotation signals from the rotation sensors are provided directly to microprocessor 104. Using the algorithm in ROM 108, microprocessor 104 calculates the forces on the inside and outside surfaces of wheel 38, and from those the size and position of the weights necessary on each side of the wheel 38 to bring it into balance by standard moment arm equations are calculated.

Data acquisition occurs during a wheel balancing spin or either of the two calibrations spins. The software is designed to input data in real-time during a balance spin via an interrupt structure. Two interrupt handling subroutines called "Home" and "Tooth" are used to perform this function. "Tooth" responds to tooth, or index, interrupts generated by the optical sensor assembly. This interrupt occurs as many times per revolution as there are index marks around the periphery of the optical disk. "Home" responds to home index interrupts generated by an index on the optical disk assembly. This interrupt occurs once per revolution of the wheel. During data acquisition each "Tooth" interrupt results in the input and storage of the three data elements associated with the "Tooth" interrupt that produce them, namely, the current values from force sensors 60 and 62, and the elapsed time since the last "Tooth" interrupt. The last data element mentioned above is a measure of the wheel speed and is used to normalize the force information for the spin. A total of four revolutions of data are input during a balancing spin. Rotation of the wheel and hub assembly causes different actions depending on the current state of the software. During a balance spin, wheel motion creates interrupts that trigger data collection. At all other times, wheel motion interrupts are used to monitor the current wheel position.

The math portion of the program can be defined as the software that operates on the three arrays of data taken during the data acquisition phase. One array contains the tooth-to-tooth interval time, measured in clock cycles from timebase 112, the other two arrays contain measurements taken from the two force sensors 60 and 62 by the A/D convertor 88. When an optical encoder disk with 100 index marks around its periphery is used, each of the three data arrays consists of 400 values. These are obtained by sampling sets of data at a rate of 100 sets per revolution for four revolutions. The math can be divided into three sections; signal characterization, calibration, and statics. Signal characterization summarizes the characteristics of the sampled waveforms in terms of the magnitude of the positive and negative peaks, and the locations of the positive and negative going crossovers. This information is subsequently converted into peak to peak amplitude, DC offset and the position of top dead center. The calibration routine uses the characterized signal information from two successive spins to calibrate the inner and outer force sensors 60 and 62. This is done by using a specified calibration weight at any position on a wheel. The wheel need not be balanced. The result is the determination of four calibration factors that correct the gain and phase of the two force sensors. The statics section solves the moment equations used to determine the magnitude and location of the inner and outer imbalance weights, converts the results to the appropriate units, and rounds or truncates the result to the nearest increment.

Figure 5A:
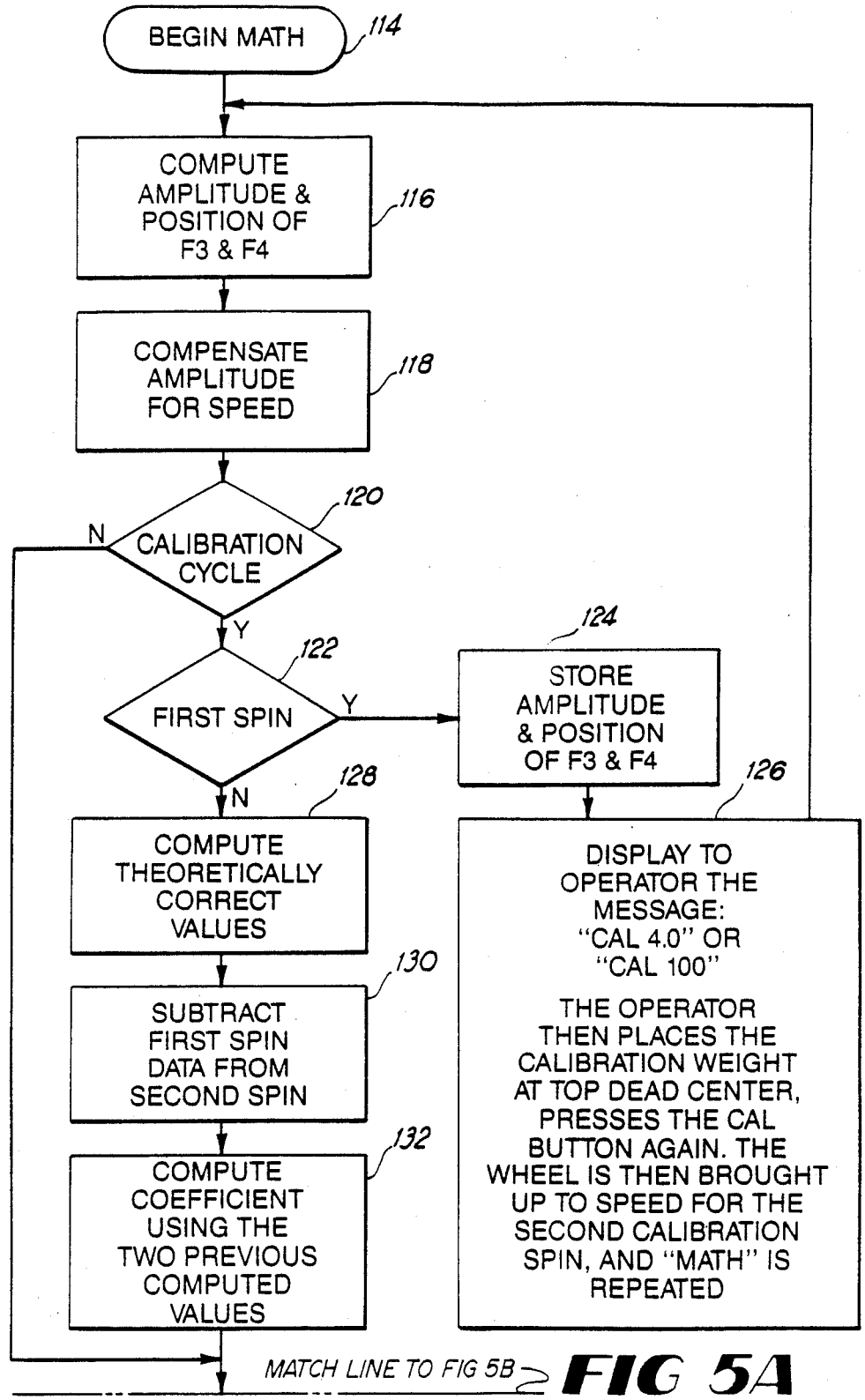
FIG. 5 is a flow chart of the data processing of the present invention.
Figure 5B:
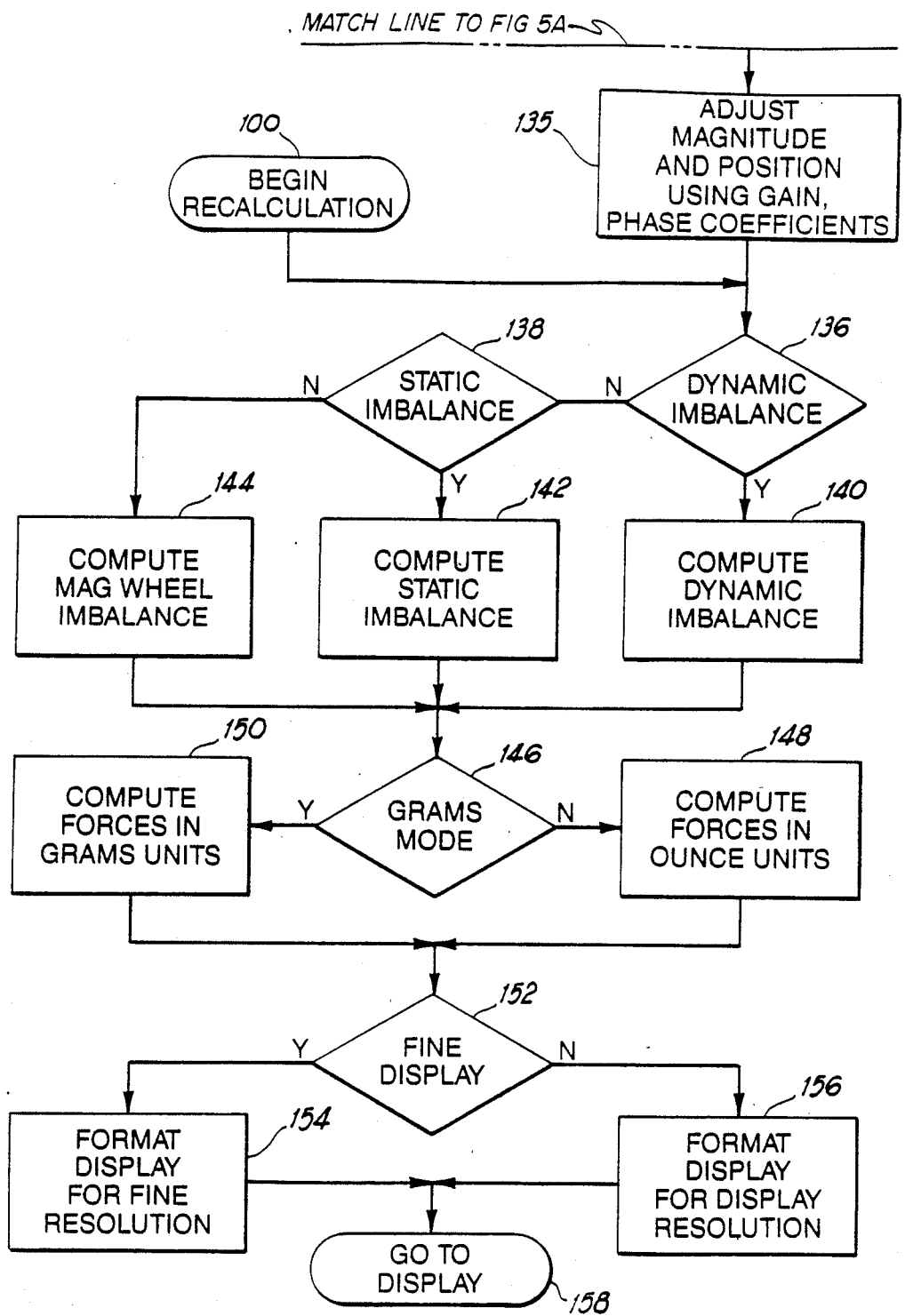
Figure 6:
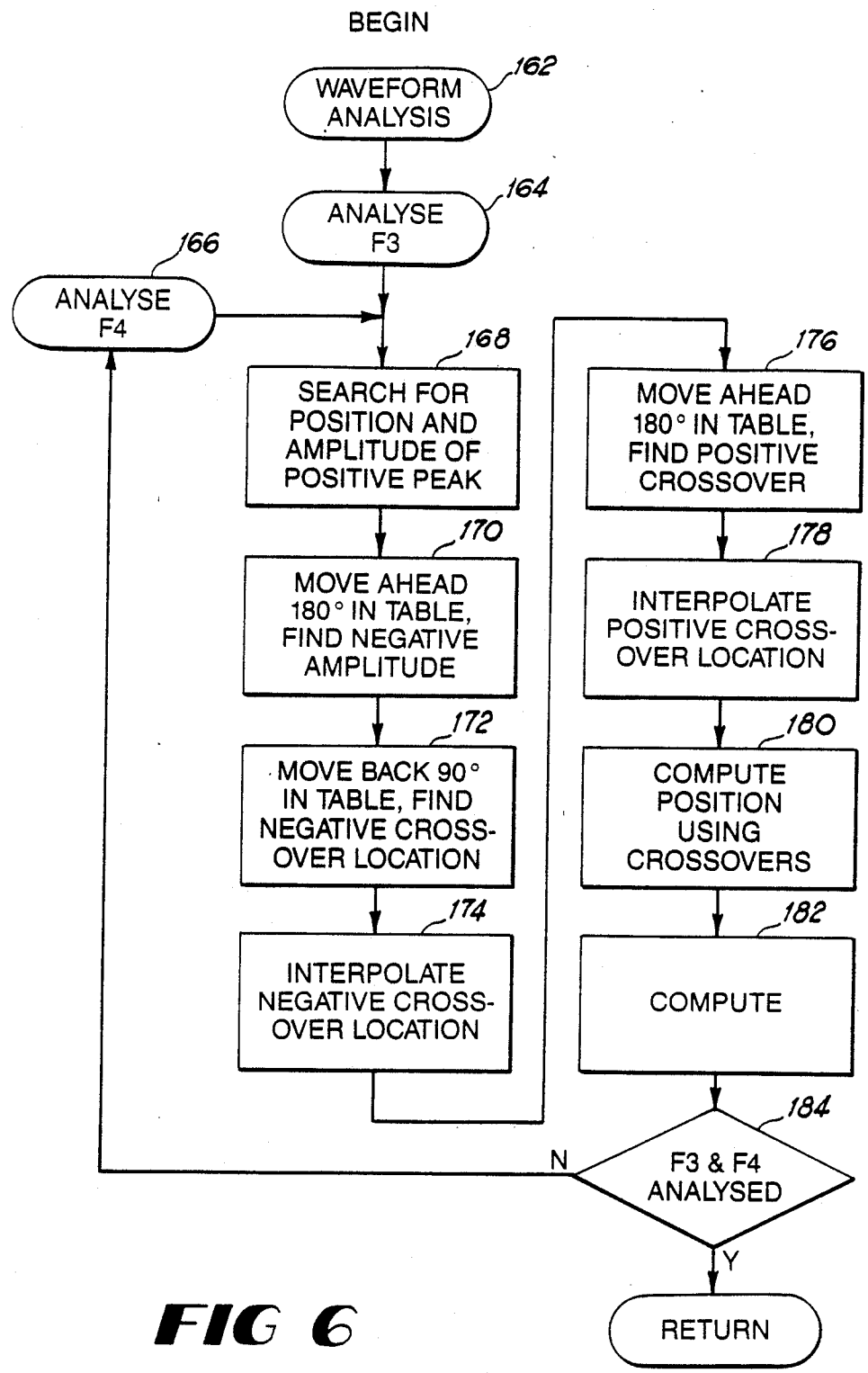
FIG. 6 is a flow chart of the computed amplitude and position of F3 and F4 step of FIG. 5.

The algorithm under which the microprocessor operates for the math portion as outlined above is shown in the flow charts of FIGS. 5 and 6. The math portion begins at block 114 and proceeds to block 116 where the positive and negative peaks, and the zero crossing points in the waveforms from force sensors 60 and 62 (forces F3 and F4) are determined. With an optical encoder that has 100 index marks, the positive and negative peaks, as well as the zero crossing points, will each be approximately 50 sample increments from each other. When one is located, the routine jumps through the table at approximately 50 sample increments, which is where the next event of interest should be. If it is not, an interpolation routine uses the information at that location to determine whether to search for the event at an earlier or a later location in the data table. This is done for four revolutions, at which point there will be four positive and four negative going crossover locations recorded. By jumping through the table rather than testing each value, calculation time is decreased.

Peak values are found in a similar fashion. Using the position information found previously, this algorithm begins by looking either 25 samples before or 25 samples after the location of the first crossover and jumping thereafter in 50 index increments. At the end of four revolutions there will be four positive, and four negative peak values recorded for each force sensor. The crossover information is used to determine waveform amplitude and offset, if any, which is easily accomplished in software. In hardware it is necessary to use trim-pots and balance the output signal gains. In block 118 normalization is performed for a selected speed since the data acquisition may have occurred at a higher or lower speed than the selected speed for which the algorithm has been developed. In the proto-type unit, the selected speed was 2.1 Hz (126 R.P.M.) which is a comfortable and safe speed to which the average wheel can be either motor or hand spun. This is done by dividing the square of the speed to which the wheel was actually spun by the square of the selected speed and multiplying the amplitude of the signals from each of the force sensors by that factor to normalize for the centrifugal force differences.

The flow chart blocks 120 through 135 represent the calibration routine of the math portion. The calibration routine of the present invention uses a two spin sequence. The first spin yields a reference set of data that will be used in subsequent calculations to remove errors that would otherwise occur if an imbalanced wheel is used for calibration. During the calibration spin calculations, the signals are characterized and adjusted for wheel speed and diameter. A vector subtraction of the first spin data from the second spin data results in a third vector representing the results from placing the calibration weight on a perfectly balanced wheel. The computed forces from the sensors 60 and 62 are compared to the theoretically correct values computed at the beginning on the calibration cycle. The difference between the real and the ideal is then compensated for by multiplying the amplitude by a gain calibration coefficient. This is defined as the reciprocal of the ratio of the theorectical to the computed value. The phase correction factor results from computing the angular difference between the computed weight position, and the position defined by the user to be top dead center.

If the user pressed the "Cal" button 32 on panel 10, then block 120 exits on the "Y" (yes) line. The wheel is then spun for one revolution, if the first spin data has not yet been stored in memory the peaks and zero crossings for one revolution, as discussed in relation to block 116, are determined and stored (block 124). Block 126 summarizes the instructions that the user is given via panel 10, namely to install a 4 ounce or 100 gram weight (depending on which measurement system was selected by the user from panel 10) on the outside surface of the wheel. This location on the wheel from this point forward will be defined as top dead center. The operator then presses the "Cal" button 32 a second time, brings the wheel back up to speed for the second calibration spin, and the math is restarted at block 116. The answer at block 120 is still yes, and the answer at block 122 is now no. The functions of blocks 128-132 are now performed by the microprocessor, namely the theoretically correct weight values and position are computed, the first spin data is subtracted from the second spin data, and by using the two previous sets of compensation values the coefficients are calculated. Control then proceeds to block 135 where the system adjusts the magnitude and position values using the newly calculated coefficients.

The Cal mode is then followed by the user now selecting a measurement mode (dynamic is the default mode) or selecting either "Static" or "Mag" mode by depressing the appropriate button (28 or 36) on panel 10, and again bringing the wheel up to speed. If the user wants the displayed weight values to be displayed in tenths of ounces or 2.5 gram increments, then he would also depress the "Std Fine" button 24 before respinning the wheel. Upon depressing one of those buttons, the system begins again at block 114, performs the caculations of blocks 116 and 118, and then advances to block 135 by the "No" response line from decision block 120. Next the amplitude and zero crossing position of the signals from sensors 60 and 62 are adjusted using the gain and phase coefficients computed at block 132. This is followed by decision blocks 136-138 to determine which balancing mode that the user has selected, which is followed by control being transferred to the appropriate one of computation blocks 140-144 to compute the size(s) and location(s) of the weights to be added to the wheel. Next, decision block 146 asks if the user wants the results in grams or not. If yes, block 150 converts the values of the weights to grams, if no, block 148 converts the values to ounces. At block 152 the system determines if the user selected the displaying of the weights in actual values calculated to the nearest 2-gram or tenth ounce increment. If yes, the weights are so formatted at block 154. If no, the weights are formatted to the nearest 5-gram or quarter of an ounce increment. The values, together with wheel position, are displayed on displays 12 and 14, as appropriate. The value of the weight to be placed on the sides of the wheel indicated with the arrows marked F1 and F2 in FIG. 1 are displayed on displays 12 and 14, respectively, as is the position for the weight. The weight position is shown on the display by means of a series of bars, when no bars are showing the position for the weight on the corresponding side of the wheel is nearest the floor and when all of the bars are showing the weight position is at the top of the wheel.

Finally, FIG. 6 is an expanded flow diagram for the computation block 116 of FIG. 5 with the calculations being performed individually for the signals from the two force sensors 60 and 62 (F3 and F4). At block 162 the algorithm is initialized followed by the start of the analysis of F3 at block 164. The analysis begins by searching the stored sampled waveform values for the position and amplitude of the positive peaks of each stored cycle of the waveform (block 168). Next, the negative peak and its amplitude of each stored cycle of the waveform are sought by advancing through the table of stored values by 180° (50 teeth for 100 tooth disk) from the locations of the positive peaks (block 170). At block 172 the table is searched 90° earlier (25 teeth for 100 tooth disk) than each negative peak for each negative zero voltage crossing location of the stored cycles of the waveform by a process of interpolation of the zero crossing locations as identified (block 174). The search is then advanced 180° (50 teeth) from each negative zero crossing point to find the positive zero voltage crossing points of the stored waveform (block 176) by interpolation to find the exact zero crossing of each point (block 178) Finally, using the crossover information, in addition to the peak information for the number of stored cycles of the waveform, a more accurate estimate of the actual position of the peaks and amplitude of the waveform are calculated (block 182) and each of those amplitudes for the stored cycles of the waveform are averaged to obtain a final value (block 182). In the prototype of the present invention two cycles were used. This final calculation is followed by decision block 184 to determine if the above described calculations have been done for both signals. If not, control is returned to block 166 and 168 to perform the same calculations for the second signal. When all signals have been calculated, then control returns to FIG. 5 block 118.

In the prototype the out of balance weights calculated by the math routine are displayed on displays 12 and 14 according to the current display modes selected. The operator can select from ounce/metric, dynamic/static, steel/mag and standard/fine resolution. The display routines are constantly being called to recalculate new numbers so that whenever a mode is changed, updated readings are immediately available.

The position portion of each displays 12 and 14 shows the operator where to place the balancing weights on the wheel. After the math routines calculate the required weights and position, the display routines show the operator where to place the weights in order to balance the wheel. This is required for both sides of the wheel.

The software does this by presenting a 5-segment display of bar-shaped LED's for each of the two balance planes. On this machine, the wheel is divided onto 100 sectors, each representing 3.6°. The LED bar display is manipulated to show a progressively increasing number of lit segments as the balancing weight position approached TDC from either direction. At TDC, all bar segments are lit and at BDC, none are lit.

This method of wheel position display gives the appearance of a moving set of lighted bars that follow the wheel as its moves back and forth through TDC with the lighted portion growing and shrinking as the imbalance location approaches or recedes from TDC. Note that 180° from TDC, no bars are lit. At the two wheel locations, TDC and BDC, the position display is arranged to provide maximum resolution by showing all bars (TDC) or no bars (BDC) for a window bounded by a single tooth.

The above described implementation of the present invention has been included as illustrative of the present invention. Implementations of the present invention other than that of the above described implementation could easily be prepared, thus the scope of the present invention is only limited by the scope of the appended claims.

What is claimed is:

1. A balancer for measuring inbalance in a vehicle wheel at any desired rotational speed, comprising:
   (a) a shaft to which the wheel may be connected so that the wheel is substantially axially aligned with the shaft;
   (b) a frame for supporting the shaft so that the shaft is free to rotate;
   (c) two transducer means for sensing forces imposed by the shaft and for providing signals that correspond to such forces as the wheel rotates, both of which transducer means are located on the same side of the wheel;
   (d) position and speed indicating means for sensing and providing signals that correspond to the angular position and speed of the wheel;
   (e) two tracking filter means, each for receiving the signals from a transducer means and speed signals from the position and speed indicating means, the center frequency of which tracking filter means may be adjusted to correspond to the speed signals;
   (f) parameter adjustment means for adjusting the gains of the signals from the transducer means in order to compensate for the width of the wheel and the distance of the wheel from the transducers;
   (g) normalizing means for adjusting the gains of the signals from the transducer means in order to compensate for the difference of their distances from the wheel; and
   (h) computing means for receiving signals from the transducer means via the tracking means and from the position and speed indicating means, for computing the imbalance of the wheel, and for indicating the size of weight which must be attached and the position at which it must be attached, in order to balance the wheel.

2. A balancer according to claim 1 in which the shaft is constrained to translate in substantially only the plane which includes the shaft and the two transducer means.

3. A balancer according to claim 1 in which the transducer means comprise piezoelectric transducers.

4. A balancer according to claim 1 in which the tracking filter means comprise digital filters.

5. A balancer according to claim 1 in which the tracking filter means comprise switching capacitor filters.

6. A balancer according to claim 1 in which the position and speed indicating means comprises:
   (a) an index disk attached to and substantially coaxially with the shaft, which disk contains a plurality of indicia located in at least one ring on at least one side of the disk; and
   (b) at least one sensor mounted stationary with respect to the disk for sensing passage of the indicia relative to the sensors.

7. A balancer according to claim 6 in which the position and speed indicating means further comprises a home index located on one side of the disk and at least one sensor for sensing passage of the home index.

8. A balancer according to claim 6 in which the sensors originate pulses which correspond in frequency to passage of the plurality of indicia relative to the sensors, and in which said pulses control the center frequency of the tracking filter means.

9. A balancer according to claim 1 in which the sensors are photoelectric devices.

10. A balancer according to claim 1 in which the sensors are magnetic proximity sensors.

11. A balancer for measuring imbalance in a vehicle wheel at any desired rotational speed, comprising:
   (a) a shaft to which the wheel may be connected so that the wheel is substantially axially aligned with the shaft;
   (b) a frame for supporting the shaft so that the shaft is free to rotate and is constrained to translate in substantially only one plane;
   (c) a pair of piezoelectric transducers interposed between the frame and the shaft substantially in the plane in which the shaft is constrained to translate, and located on the same side of the wheel, for sensing forces imposed by the shaft, each of which transducers provides signals that correspond to such forces as the wheel rotates;

(d) at least one sensor means for sensing and providing signals that correspond to the angular position and speed of the wheel;

(e) a pair of tracking filters, each of which receives signals from a corresponding transducer and speed signals from the sensor means, the center frequency of which tracking filters vary relative to the speed signals;

(f) parameter adjustment means for adjusting the gains of the signals from the transducer means in order to compensate for the width of the wheel and the distance of the wheel from the transducers;

(g) normalizing means for adjusting the gains of the signals from the transducer means in order to compensate for the difference of their distances from the wheel; and (h) microprocessor computing means for receiving signals from the transducers and from the sensor means, for computing the imbalance of the wheel, and for indicating the size of weight which must be attached, and the position at which it must be attached, in order to balance the wheel.

12. A balancer according to claim 11 in which the tracking filters comprise digital filters.

13. A balancer according to claim 11 in which the tracking filters comprise switching capacitor filters.

14. A balancer according to claim 11 in which the sensor means comprises at least one photoelectric device for sensing angular velocity and angular position of the wheel.

15. A method for measuring imbalance of a vehicle wheel, comprising the steps of:

(a) mounting the wheel on a shaft so that the wheel is oriented substantially coaxially with the shaft, which shaft is supported at two points, and is free to rotate;

(b) rotating the wheel and shaft to any desired angular velocity;

(c) allowing the wheel and shaft to coast to any desired angular velocity;

(d) measuring the pressure between the shaft and each of the support points as the wheel and shaft rotate, using transducers, in order to produce signals that are proportional to the force imposed by the shaft on each of the points;

(e) measuring the angular velocity and angular position of the wheel as it rotates, in order to produce signals that are proportional to the angular velocity and angular position of the wheel;

(f) filtering the force-proportional signals using a pair of tracking filters, each of which receives force-proportional signals corresponding to one of the support points and augular velocity-proportional signals, and the center frequency of each of which tracks the angular velocity-proportional signals; and (g) computing, using the filtered force-proportional signals, the angular velocity signals, and the angular position signals, the magnitude and position of the imbalance in the wheel;

(h) adding a known weight at any desired location on the wheel and noting that location;

(i) repeating step (b) through (f);

(j) computing, using the filtered force-proportional signals, the angular velocity signals and the angular position signals, the magnitude and position of the imbalance of the weighted wheel;

(k) comparing the magnitude and position information from step (g) for the unweighted wheel to the magnitude and position information from step (j) for the weighted wheel to calculate empirical imbalance information relating to magnitude and position of the imbalance of a hypothetical wheel with the weight added at the noted location;

(l) computing theoretical imbalance information relating to magnitude and position of the imbalance of the hypothetical wheel mentioned in step (k);

(m) comparing said empirical and theoretical imbalance information to compute magnitude and position calibration information;

(n) removing the weight from the wheel;

(o) repeating steps (b) through (f); and (p) computing and indicating, using the filtered force-proportional signals, the angular velocity signals, the angular position signals, and the calibration information, the size of the weight which must be attached, and the position at which it must be attached, in order to balance the wheel.

16. The method according to claim 15 in which digital tracking filters are used to filter the force-proportional signals.

17. The method according to claim 15 further including the step of adjusting the magnitude of the force-proportional signals to account for the distance between the two support points.

18. The method according to claim 15 further including the step of adjusting the magnitude of the force-proportional signals to account for the width of the wheel and the distance of the wheel from the transducers.

19. The method according to claim 15 further comprising the step of scaling the magnitude of the force-proportional signals to correspond to a predetermined angular velocity.

20. The method according to claim 15 further comprising the step of constraining the shaft to translate in substantially the plane containing the shaft and the support points.

* * * * *